United States Patent [19]

Bunn et al.

[11] 4,350,179

[45] Sep. 21, 1982

[54] VALVE ASSEMBLY WITH RELIEF GROOVE

[76] Inventors: Stuart E. Bunn; Herbert B. Owsley, both of 6412 Carter Ave., Shawnee Mission, Kans. 66203

[21] Appl. No.: 191,015

[22] Filed: Sep. 26, 1980

[51] Int. Cl.³ .............................................. F16K 15/06
[52] U.S. Cl. ............................. 137/540; 137/246.12; 137/484.2; 137/536
[58] Field of Search ............ 137/540, 542, 543, 513.3, 137/513.5, 513.7, 472, 484.2, 484.4, DIG. 3, 246.12

[56] References Cited

U.S. PATENT DOCUMENTS

| 306,686 | 10/1884 | Hills | 137/472 |
|---|---|---|---|
| 391,472 | 10/1888 | Hughes | 137/472 |
| 487,029 | 11/1892 | Gray et al. | 137/472 |
| 1,363,248 | 12/1920 | Gritznel . | |
| 1,471,955 | 10/1923 | Grieve . | |
| 1,560,235 | 11/1925 | Hinsch . | |
| 2,023,915 | 12/1935 | Connell . | |
| 2,299,847 | 10/1942 | Price | 137/540 |
| 2,406,243 | 8/1946 | Newton et al. . | |
| 2,659,388 | 11/1953 | Rand . | |
| 2,713,989 | 7/1955 | Bryant . | |
| 3,157,200 | 11/1964 | Rowan . | |
| 3,219,063 | 11/1965 | Schumann et al. . | |
| 3,245,429 | 4/1966 | Bacino et al. . | |
| 3,431,028 | 3/1969 | Yoder | 137/513.5 X |
| 3,474,808 | 10/1969 | Elliott | 137/543 |
| 3,756,560 | 9/1973 | Siepmann . | |

Primary Examiner—William R. Cline
Attorney, Agent, or Firm—Litman, Day and McMahon

[57] ABSTRACT

A valve assembly for controlling the flow of fluid, has a passage for fluid flow therein and open and closed positions whereby fluid flow through said passage is respectively allowed and prevented. First and second mating surfaces define a contact area therebetween when the valve assembly is in its closed position. Relief means is provided for communicating fluid from the passage with an inner portion of the contact area for operably reducing a force required to disengage the mating surfaces and open the valve assembly.

17 Claims, 10 Drawing Figures

VALVE ASSEMBLY WITH RELIEF GROOVE

This invention relates to valve assemblies for controlling flow of fluid under pressure through fluid moving structures and, more particularly, to a lift-type valve assembly for controlling uni-directional flow of fluid under pressure through pumps, compressors and the like.

BACKGROUND OF THE INVENTION

Lift-type valve assemblies are well-known in the field of fluid moving structures and a variety of different designs have been developed in an attempt to achieve efficient and reliable control of fluid movement. Such valve assemblies typically have valve members which are retained by springs in a closed position in separate inlet and outlet passages and prevent fluid flow therebetween. The valve members are automatically movable to open positions when the inlet passage fluid pressure exceeds the outlet passage fluid pressure by a sufficient amount. This fluid pressure "differential" is a function of several factors including the closing force exerted by the springs; the amount of surface area exposed to fluid pressure on either side of the valve member; and the amount of cohesion or "stiction" between the valve member and valve seat. In fluid moving structures such as pumps and compressors reducing the fluid pressure differential required to open the valves will generally result in an increase in operating efficiency, because less "work" is required to move an equivalent amount of fluid and because lower fluid temperatures will be maintained at such lower pressures.

In operation, such valve assemblies automatically open and close very rapidly and the valve members strike the valve seats with considerable force. Therefore, the useful life of the valve members may be prolonged by providing a substantial contact area between the valve members and the valve seats to absorb the shock upon engagement as the valve closes. However, such a substantial contact area can be detrimental to valve efficiency because substantially less surface area of the valve member is thereby exposed to the greater inlet passage fluid pressure than is exposed to the outlet passage fluid pressure. Because the lifting force is a function of both the fluid pressure and the surface areas upon which such pressures act, increasing the contact area generally increases the required pressure differential. Also, further operating efficiency is lost because of the cohesion or "stiction" present thereat which tends to resist separation and opening of the valve assembly. Such a cohesion may be caused by a vacuum effect or a molecular attraction or both between the mating surfaces and is common in lift-type valve assemblies where such mating surfaces tend to be relatively close fitting to minimize fluid leakage. Therefore, a greater fluid pressure differential is required to overcome such cohesive force and fluid moving structure efficiency is accordingly lessened.

Prior art valve assemblies utilizing substantial contact areas for increased valve life have heretofore not provided relief means for alleviating such problems associated with substantial contact areas between the valve members and valve seats.

SUMMARY OF THE INVENTION

In the practice of the present invention, a lift-type valve assembly is provided which opens in response to a lower pressure differential than similar prior art devices and which provides relatively long valve member life. The valve assembly has a fluid flow passage therein which includes an inlet portion and an outlet portion. A valve member is movably mounted between a closed position engaging a valve seat and an open position for allowing fluid to flow from the inlet portion to the outlet portion. Relief means is provided for communicating fluid from the passage with an inner portion of a contact area where the valve member and valve seat engage. The relief means thereby functions to lower the pressure differential which would otherwise be required to open the valve assembly. The fluid thus communicated engages the valve member within the contact area for providing additional lifting force and also facilitates breaking the vacuum-like cohesion between the valve member and the valve seat.

The principle objects of the present invention are: to provide a valve assembly wherein an inner portion of a contact area between a valve member and valve seat is exposed to pressurized fluid exerting a lifting force against the valve member; to provide a valve assembly which relieves or minimizes a cohesive seal between mating surfaces whereby less work is required to disengage the mating surfaces and open the valve assembly; to provide such a valve assembly which allows a fluid moving structure to operate efficiently and reliably; to provide such a valve assembly which is adapted for use in both intake and exhaust or discharge valves; to provide such a valve assembly with a relief means adapted for use in channel valves, feather valves, flapper valves, poppet valves and plate or flat valves; to provide such a valve assembly for use in a lift-type valve structure having a valve member therein whereby the valve member is more easily disengaged from an associated valve seating surface and less pressure differential within the valve assembly is required to open same; to provide such a valve assembly with a substantial contact area between the respective mating surfaces thereof for absorbing shock upon closing; to provide such a valve assembly wherein the fluid is maintained at a lower temperature as it flows therethrough; to provide such a valve assembly with a relief means which communicates fluid from a fluid flow passage to the contact area between the respective mating surfaces to facilitate breaking a seal or cohesion tending to form therebetween; to provide such a valve assembly with a relief groove communicating fluid from a fluid flow passage with the intermediate groove whereby opening of the valve assembly is facilitated and to provide such a valve assembly which is economical to manufacture, efficient in use, capable of a long operating life and particularly well adapted for the proposed usage thereof.

Other objects and advantages of this invention will become apparent from the following description taken in conjunction with the accompanying drawings wherein are set forth by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 5b is an enlarged, partial, vertical, cross-sectional view of the modified poppet valve assembly shown in FIG. 5a.

DESCRIPTION OF THE PREFERRED EMBODIMENTS

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 1:
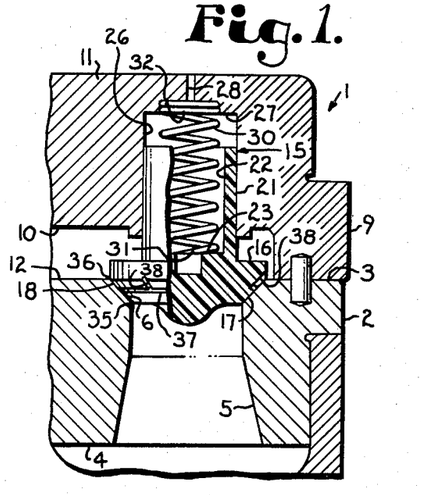
FIG. 1 is vertical cross-sectional view of a poppet valve assembly according to the present invention in a closed position showing a poppet valve member with relief grooves thereon communicating a contact area with an outlet passage.
Figure 2:
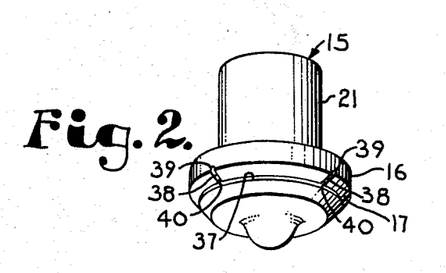
FIG. 2 is a perspective view of the poppet valve member as shown in FIG. 1 particularly showing the relief grooves and an intermediate groove.
Figure 3:
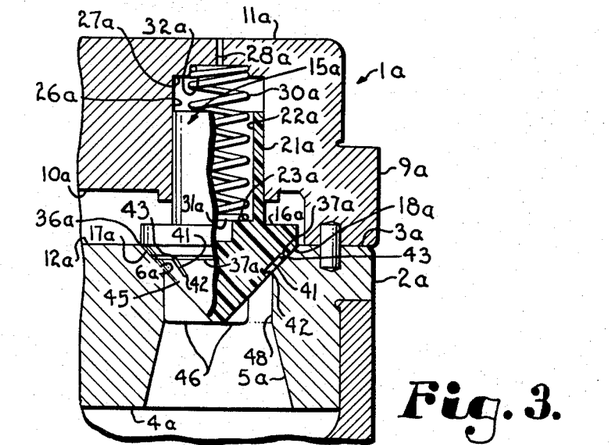
FIG. 3 is a vertical cross-sectional view of a first modified embodiment of the poppet valve assembly with a poppet valve member in closed position having a guide structure and relief grooves thereon communicating the contact area with an inlet passage.
Figure 4:
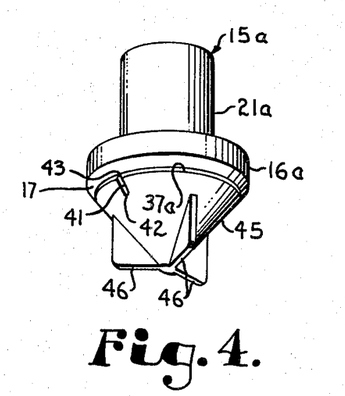
FIG. 4 is a perspective view of the first modified poppet valve member shown in FIG. 3 particularly showing the guide structure, a relief groove and an intermediate groove.
Figure 5A:
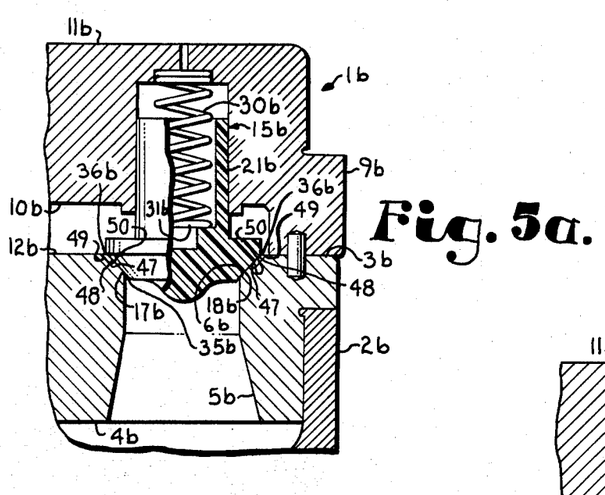
FIG. 5a is a vertical cross-sectional view of a second modified embodiment of the poppet valve assembly showing a poppet valve member in seating engagement with a valve seat, the valve seat having a relief groove thereon communicating with an outlet passage.
Figure 5B:
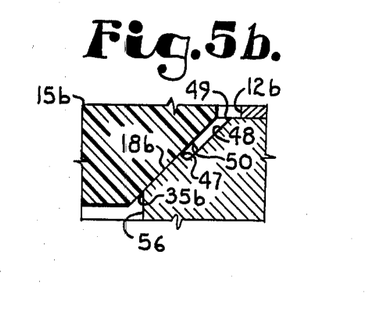
Figures 6, 7, 8, 9:
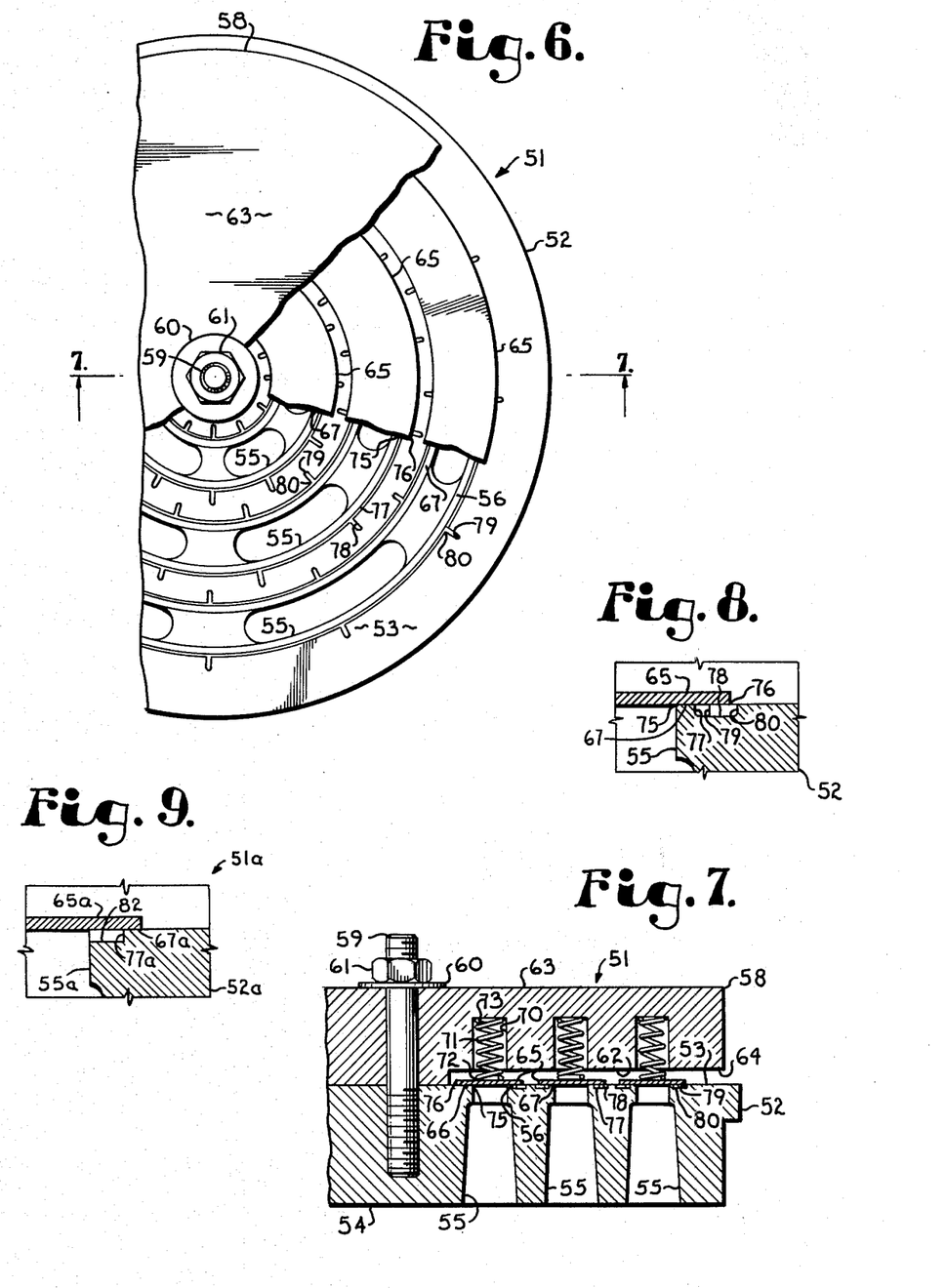
FIG. 6 is a partial plan view of a plate valve assembly with portions broken away to better show structural details thereof.
FIG. 7 is a partial vertical cross-sectional view of the plate valve assembly as shown in FIG. 6 taken along line 7—7.
FIG. 8 is an enlarged, partial, vertical, cross-sectional view of the plate valve assembly as shown in FIG. 6 taken along line 8—8 and particularly showing the relief grooves and intermediate groove.
FIG. 9 is an enlarged, partial, vertical, cross-sectional view of a modified embodiment of the plate valve assembly particularly showing a relief groove opening into an inlet passage.

For purposes of the description herein the terms "upper", "lower", "right", "left", "rear", "front", "vertical", "horizontal", and directional derivitives thereof shall relate to the invention as oriented in FIG. 1 for the embodiment shown in FIGS. 1 and 2, to FIG. 3 for the embodiment shown in FIGS. 3 and 4, to FIG. 5a for the embodiment shown therein and in FIG. 5b, and to FIG. 7 for the embodiments shown in FIGS. 6, 7, 8 and 9. However, it is to be understood that the invention may assume various alternative orientations except where expressly specified to the contrary.

Referring to the drawings in more detail;

The reference numeral 1 as seen in FIGS. 1 and 2 generally indicates a lift-type poppet valve assembly for controlling flow of fluid under pressure through a fluid moving structure (not shown) such as a conventional piston type compressor. The present invention may be utilized with either intake or discharge valves or with exhaust valves in either single or multiple deck valve assemblies. The valve assembly 1 includes a seat structure 2 having an inner surface 3 and an outer surface 4 with an inlet passage 5 extending therebetween. A valve seat or mating surface 6 is positioned at an end of the inlet passage 5 associated with the seal structure inner surface 3. A cage structure 9 having an inner surface 10 and an outer surface 11 is suitably secured with its inner surface 10 in opposed relation to the inner surface 3 of the seat structure 2 whereby an outlet passage 12 is defined therebetween for fluid flow.

A poppet valve member 15 is movably mounted between the seat structure 2 and the cage structure 9 to open when fluid pressure in the inlet passage 5 is sufficiently greater than fluid pressure in the outlet passage 12 and to close or engage the mating surface 6 when the fluid pressure differential with respect to the inlet passage 5 and the outlet passage 6 is sufficiently decreased. A valve head or seating disc 16 includes a mating surface 17 thereon which is adapted for mating with the valve seat or mating surface 6. In FIG. 1 of the present embodiment the valve member 15 is shown in seating engagement with the mating surface 6 of the seat structure 2 thereby providing a contact area 18 therebetween. The valve member 15 is seated on the seat structure 2 whereby the mating surface 17 engages the mating surface 6 to substantially seal the inlet passage 5 against fluid flow from the outlet passage 12 when the valve member 15 is in its closed position.

A hollow, cylindrical valve stem 21 extends from the valve head 16 and has a valve stem bore 22 therein having an end portion 23 near the valve head 16. The cage structure 9 has a guide bore 26 extending from the inner cage surface 10 thereof and terminating in spaced relation to the outer cage surface 11. The guide bore 26 is aligned with the valve seating face 6 of the seat structure 2. The guide bore 26 is illustrated as being a cylindrical recess adapted to receive the valve stem 21 in sliding engagement therein. The guide bore 26 has an end portion 27 with a vent passage 28 extending therefrom to the outer cage surface 11 to exhaust fluid from within the guide bore 26 and thereby facilitate lifting of the valve member 15.

Resilient means such as the illustrated elongated helical compression spring 30 is positioned within the valve stem bore 22 and has a first end portion 31 engaging the valve stem bore end portion 23 and a second end 32 engaging the guide bore end portion 27. The helical spring 30 is adapted for urging the valve member 15 into seating engagement with the valve seat or mating surface 6 to close the inlet passage 5.

In the first embodiment of the present invention the valve member mating surface has a frusto-conical configuration which corresponds to the bevelled shape of the valve seat or mating surface 6 for engagement therebetween. The contact area 18 defined between the respective mating surfaces 6 and 17 has a first peripheral portion 35 adjacent the inlet passage 5 and a second peripheral portion 36 adjacent the outlet passage 12 FIG. 1. In lift-type valves such as the poppet valve assembly 1 it is desirable to have a substantial contact area 18 where the respective mating surfaces 6 and 17 engage to distribute the impact over upon closing of the valve member 15. Otherwise, if the impact forces are concentrated on a relatively small contact area, the valve member will deteriorate more rapidly under its own rapid opening and closing movements.

The valve member mating surface 17 is encircled by an intermediate groove 37 coaxial with and in spaced relation to the first and second peripheral portions 35 and 36 of the contact area 18 (FIG. 2). A plurality of circumferentially spaced relief grooves 38 extend in a radial manner across the valve member mating surface 17 from respective first ends 39 opening into the outlet passage 12 and second ends 40 opening into the intermediate groove 37 when the valve member 15 is in its closed position. Applicant has found that such interconnected intermediate and relief grooves tend to lower the pressure differential required to open the valve assembly 1 and thereby increase the efficiency of the fluid moving structure. The required pressure differential is lowered because the pressurized fluid within the grooves exerts forces against portions of the mating surfaces. The grooves thereby effectively increase the surface area of the valve member exposed to the pressurized fluid and, because greater lifting force will thus be exerted by the same pressure acting on a larger area, the required pressure differential will be decreased. Also, applicant theorizes that a cohesion or "stiction" forms between the mating surfaces and tends to resist separation therebetween and opening of the valve assembly. Although the exact nature of such force is unknown, it may be associated with a vacuum seal or molecular attraction between closefitting surfaces, such as the mating surfaces defining the contact area in the valve assembly. Applicant has found that utilizing grooves as shown significantly increases the efficiency of a fluid moving structure and it is believed that at least part of this increase is because the grooves facilitate breaking such a seal or cohesion.

In operation of the valve assembly 1 as an intake valve in a piston type compressor (not shown), the valve member 15 is in seating engagement with the valve seat or mating surface 6 as shown in FIG. 1 when the valve assembly is in its closed position. A pressure differential is then created across the valve assembly 1 by decreasing the fluid pressure in the outlet passage 12 which lifts the valve member 15 from seating engagement with the valve seat or mating surface 6 whereby fluid is allowed to flow from the inlet passage 5 to the outlet passage 12. As fluid flows through the respective passages 5 and 12 the pressure differential therebetween is reduced such that the force exerted by the helical spring 30 is greater than the force created by the remaining differential pressure so as to return the valve member 15 to seating engagement with valve seat or mating surface 6.

In operation as an exhaust or discharge valve the valve member is in closed position as shown in FIG. 1 and the compressor piston (not shown) than pressurizes fluid in the inlet passage 5 until the pressure differential across the valve assembly 1 is sufficient to lift the valve member 15 and allow fluid to flow therethrough. When the pressure differential is sufficiently reduced, the helical spring 30 returns the valve member 15 to seating engagement with the valve seating face 6. By providing the relief groove 38 communicating fluid from either the inlet passage 5 or the outlet passage 12 to the contact area 18, less pressure differential across the valve assembly 1 will be required to lift the valve member 15. The fluid moving structure will thereby be operated more efficiently and move equivalent amounts of fluid as conventional structures with less energy. Also, because of lower pressures required in the inlet and outlet passages 5 and 12 respectively to reciprocate the valve member 15, the compressed fluid will be moved at a lower temperature with a resultant additional increase in compressor efficiency. Further, by providing the relief grooves 38, the contact area 18 may be substantially larger than those found in conventional valve assemblies to reduce the wear on the valve member 15 and thereby increase the serviceable life thereof by distributing the impact upon closing over a larger contact area 18.

A modified embodiment of the poppet valve assembly generally designated 1a having a modified valve member 15a is shown in FIGS. 3 and 4. Elements of the modified embodiment of the valve assembly 1a which are otherwise substantially the same as the previously described device 1 are represented by the same corresponding reference numerals except for the addition of the suffix "a" to the numerals of the modified structure.

The valve member 15a includes a valve head 16a with a guide member 45 thereon similar to that disclosed in applicants' U.S. Pat. No. 3,701,361 for a VALVE ASSEMBLY AND VALVE MEMBER THEREFOR. The guide structure 45 comprises an extension of the frusto-conical shaped valve member mating surface 17a with a plurality of angularly spaced fins 46 extending therefrom as best shown in FIG. 4. The fins 46 are adapted for slidably engaging the inlet passage 5a to thereby effect a true linear movement of the valve member 15a as it moves toward and away from the valve seat or mating surface 6a while respectively closing and opening.

The valve member mating surface 17a has a groove 37a thereon intermediate and generally coaxial with first and second peripheral portions 35a and 36a respectively of a contact area 18a. A plurality of relief grooves 41 each has a first end 42 opening into the inlet passage 5a when the valve member 15a is in seating engagement with the mating surface 6a as is shown in FIG. 3. Each relief groove 41 also has a second end 43 opening into the intermediate groove 37a whereby fluid is communicated from the inlet passage 5a to the intermediate groove 37a and thus to the contact area 18a. The relief grooves 41 of the modified valve assembly 1a function in substantially the same manner as the relief grooves 38 of the valve assembly 1 to reduce the fluid pressure differential across the valve assembly 1a required to disengage and lift the valve member 15a. However, unlike the first embodiment, the relief grooves 38 communicate fluid from the inlet passage 59 which has a higher fluid pressure therein than the outlet passage 12a immediately prior to the valve member opening. Such fluid under a higher pressure will exert a greater force within the contact area to lift the valve member and break the cohesion or seal. It is thereby anticipated that the valve assembly of this embodiment will require an even lower fluid pressure differential to open it than the first embodiment.

FIGS. 5a and 5b illustrate a further modified poppet valve assembly 1b with an intermediate groove 47 and relief grooves 48 on the valve seat or mating surface. Since the valve assembly 1b is substantially the same as the previously described assembly 1, therefore similar parts appearing in FIGS. 5a and 5b and FIGS. 1 and 2 respectively are represented by the same corresponding reference numeral except for the addition of the suffix "b" to the numerals of the further modified valve assembly 1b.

A valve member mating surface 17b of the further modified valve assembly 1b represents a substantially uniform surface having a frusto-conical configuration. The intermediate groove 47 is functionally equivalent to the other intermediate grooves 37 and 37a respectively of the first and second embodiments. The relief grooves 48 have first ends 49 and second ends 50 communicating fluid respectively from the outlet passage 12b to the intermediate groove 47 and thus to the contact area 18b and similarly facilitate lifting the valve member 15a and breaking the cohesion or suction seal formed at the contact area 18 by forces associated with the engagement of two closely mating surfaces. As with the previously described embodiments the differential pressure across the valve assembly 1b required to lift the valve member 15b is thereby reduced. Because the intermediate groove 47 and the relief grooves 48 are on the valve seat or mating surface 6b, conventional poppet valve members 15b without grooves thereon may be utilized with this embodiment for improved operation in fluid moving structures.

It is anticipated that other alternative configurations could successfully utilize the present invention with the same inherent advantages. For example, in the further modified valve assembly 16 the relief groove 48 on the valve seat or mating surface 6b could communicate with the inlet passage 5b instead of the outlet passage 12b as is shown in FIG. 5. Also, the intermediate groove could be positioned on one mating surface and the relief groove or grooves positioned on the other mating surface whereby the inermediate and relief grooves would cooperate to communicate fluid therebetween to facilitate opening the valve assembly when the valve member is in its closed position. It is further foreseen that various combinations and numbers of relief grooves 38 and intermediate grooves 37 could be utilized according to the present invention.

FIGS. 6, 7 and 8 illustrate a plate valve assembly 51 utilizing the present invention. A seat structure 52 includes an inner surface 53 and an outer surface 54 with inlet passages or ports 55 extending therebetween. Valve seat or mating surfaces 56 surround the inlet passages or ports 55 on the inner surface 53. A cage structure 58 is secured to the seat structure 52 by a suitable threaded stud 59 with a washer 60 and a nut 61 adjacent an outer cage surface 63. A fluid flow outlet passage 64 is defined between the inner seat surface 53 and an inner cage surface 62. A plurality of concentric circular valve plates 65 are mounted within the outlet passage 64. The valve plates 64 have mating surfaces 66 thereon adapted for engaging the valve seat or mating surfaces 56 whereby contact areas 67 are defined therebetween when the valve assembly 51 is in a closed position. The cage structure 58 has a plurality of bores 70 extending from and generally perpendicular to the inner cage surface 62. Each bore 70 has an elongated helical spring 71 therein with a first end 72 engaging a respective valve plate 65 and a second end 73 engaging a bore end portion 69. The elongated helical springs 71 urge valve plates 65 associated therewith into seating engagement with respective valve seat or mating surfaces 56.

The several contact areas 67 have generally coaxial circular configurations as is shown in FIG. 6. When the valve assembly 51 is in a closed position each of the contact areas 67 has a first peripheral portion 75 adjacent a respective inlet passage or port 55 and a second peripheral portion 76 adjacent the outlet passage 64 (FIG. 8). As with the poppet valve assemblies previously described, substantial contact areas 67 are desireable in the plate valve assembly 51 to distribute the impact upon closing of the valve plates 65 and thus reduce wear and increase the serviceable lives thereof.

A concentric intermediate groove 77 is provided on each valve seating face 56 between the first and second peripheral portions 75 and 76 respectively of each contact area 67. A plurality of relief grooves 78 extend radially outwardly across each of the valve seating faces 56 from first ends 79 opening into respective intermediate grooves 77 and past the second peripheral portions 76 of respective contact areas 67 to second ends 80 opening into the outlet passage 64 when the valve seat or mating surfaces 56 engage the valve plate mating surfaces 66 and the valve assembly 51 is closed (FIG. 6). The relief grooves 78 are adapted for communicating fluid from the outlet passage 64 to the respective intermediate groove 77 and thus to the respective contact areas 67 to exert a lifting force against the valve plates 65 and to, facilitate breaking a cohesive force or seal which occurs between the mating surfaces 56 and 66 at respective contact areas 67.

In operation as an intake valve in a piston type compressor (not shown), the valve plates 65 are in seating engagement as shown in FIG. 7 when the plate valve assembly 51 is in a closed position. A pressure differential across the plate valve assembly 51 is then created by decreasing the fluid pressure in the outlet passage 64 until the fluid pressure in the inlet passages 55 is sufficient to overcome the combined forces of the outlet passage pressure, the springs 71 and the cohesion or seal at the contact areas 67. The valve plates 65 are thereby lifted from seating engagement with the respective valve seat or mating surfaces 56 and fluid is allowed to flow from the inlet passages 55 to the outlet passage 64. The resulting fluid movement through the plate valve assembly 51 thereby reduces the pressure differential across same sufficiently to allow the helical springs 71 to reciprocate the valve plates 65 to seating engagement with their respective valve seats or mating surfaces 56 and close the valve assembly.

In operation as an exhaust or discharge valve, the valve plates 65 are in their closed position as shown in FIG. 6 and the compressor piston (not shown) pressurizes fluid in the inlet passages 55 until the pressure differential across the plate valve assembly 51 is sufficient to lift the valve plates 65 and allow fluid to flow therethrough until the helical springs 71 reciprocate the valve plates 65 and the valve assembly 51 is closed in the same manner as above described. It has been found that by communicating fluid by means of the intermediate grooves 77 and the relief grooves 78 from the outlet passage 64 to the contact areas 67 that a lower pressure differential across the plate valve assembly 51 is required to lift the valve plates 65 to an open position. The fluid moving structure will thereby operate more efficiently and move equal amounts of fluid as compared to conventional structures with the expenditure of less energy. Also, because of the lower pressure required in the inlet passages 55 and the outlet passage 64 to reciprocate the valve plates 65, the compressed fluid will be moved at a lower temperature with a further resultant increase in compressor efficiency.

Because the cohesion between the mating surfaces is operably lessened by the relief grooves 78, substantially larger contact areas 67 may be employed as compared to conventional structures of this type, thereby better distributing the impact on closing of the valve plates 65 and in turn reducing the wear on the valve plates 65 for longer serviceability thereof. The relief grooves 78 are particularly effective when used in combination with coaxial intermediate grooves 77 as shown, because the intermediate grooves 77 expose the fluid admitted by respective relief grooves 78 to greater portions of the contact areas 67 to exert lifting firce against the valve plates 65.

FIG. 9 shows a modified embodiment generally designated 51a of the plate valve assembly 51 as shown in FIGS. 6, 7 and 8. Elements of the modified embodiment of the valve assembly 51a which are otherwise substantially the same as the previously described device 51 are represented by the same corresponding reference numerals except for the addition of the suffix "a" to the numerals of the modified structure.

The plate valve 51a includes a seat structure 52a with an inlet passage 55a therethrough and a valve plate 65a shown in a closed position whereby a contact area 67a is defined. The relief groove 82 communicates fluid from the inlet passage 55a to the intermediate groove 77a and the contact area 67a, unlike the plate valve assembly 51 wherein the relief grooves 78 open into the outlet passage. Because the fluid pressures in the inlet passage must exceed those in the outlet passage for the valve to open, equivalent relief grooves 82 of the modified valve assembly 51a will communicate fluid to the intermediate grooves 77a and the contact areas 67a under greater pressure than in the plate valve assembly 51. The required fluid pressure differential will be accordingly lower and, although both plate valve embodiments represent an improvement over conventional plate valves, the modified structure 51a is believed by applicant to be the more efficient.

As with the poppet valve assembly 1 and the modified embodiments thereof, 1a and 1b, other alternative configurations of the plate valve assemblies 51 and 51a could successfully utilize the present invention with the same inherent advantages. For example, the relief grooves and intermediate grooves could be on the plate valve mating surfaces as opposed to the valve seats on the seat structure. Further, intermediate grooves could be on one of the mating surfaces and the relief grooves on the other mating surface whereby the respective relief and intermediate grooves would cooperate to communicate fluid to the contact areas when the valve plates are in seating engagement in their closed positions.

In either a plate or a poppet valve assembly, the relief grooves are particularly effective with an intermediate groove because the intermediate groove exposes the fluid admitted by the relief grooves to a greater portion of the contact area. The amount of contact area exposed to the fluid may be further increased by positioning the intermediate groove adjacent one of the contact area peripheral portions and leaving only a "line" or "knife edge" contact between the valve member and valve seat to seal against fluid flow when the valve assembly is closed. Fluid may thereby be communicated further into the contact area to exert a lifting force against the valve member and to facilitate breaking the cohesion or seal at the mating surfaces.

While the cohesive forces present at the contact areas between the mating surfaces of the different embodiments have been described as being associated with a vacuum like seal or molecular attraction, it is forseen that the relief means of applicants' invention would be useful for operably reducing other forces associated with surface engagement and thereby facilitating the disengagement of such objects.

It is to be understood that while certain forms of this invention have been illustrated and described it is not to be limited thereto except insofar as such limitations are included in the following claims.

What is claimed and desired to secure by Letters Patent is:

1. A lift-type valve assembly for controlling flow of fluid therethrough; said assembly comprising:
(a) a passage through said valve assembly for fluid flow;
(b) a seat member having an inlet portion of said passage therein and a first mating surface surrounding said passage inlet portion;
(c) a cage member positioned in spaced relation to said seat member such that an outlet portion of said passage for fluid flow is defined between said cage and seat members for receiving fluid from said inlet portion of said passage;
(d) a valve member having a second mating surface engaging said first mating surface to define a contact area between said mating surfaces when said valve member is in a closed position whereby fluid flow through said passage is substantially prevented, said valve member being movably mounted with respect to said seat member between said closed position and an open position for allowing fluid to flow through said passage;
(e) means for urging said valve member to said closed position; and
(f) relief means comprising a relief groove extending along one of said first and second surfaces from an interior of said contact area to a periphery of said contact area; said relief groove communicating fluid from said passage with an inner portion of said contact area for operably reducing a force required to disengage said mating surfaces and move said valve member to said open position; said relief groove not extending between said inlet portion of said passage and said outlet portion of said passage such that fluid does not flow from said inlet portion to said outlet portion through said relief groove when said valve is in the closed position thereof.

2. A valve assembly as set forth in claim 1 wherein;
(a) said force required to move said valve member from said closed position to said open position comprises a fluid pressure in said fluid flow passage sufficient to disengage said mating surfaces;

3. A valve assembly as set forth in claim 2 wherein:
(a) said passage fluid pressure creates a pressure differential with respect to said inlet and outlet portions of said passage, said pressure differential being sufficient to overcome said means urging said valve member to said closed position and thereby disengage said mating surfaces and open said valve assembly; and
(b) said relief means materially reduces the fluid pressure differential required to disengage said mating surfaces and open said valve assembly.

4. A valve assembly as set forth in claim 2 wherein:
(a) said contact area has a first peripheral portion surrounding and adjacent said passage inlet portion and a second peripheral portion adjacent said passage outlet portion; and
(b) one of said mating surfaces has an intermediate groove intermediate and in spaced relation to said first peripheral portion and said second peripheral portion of said contact area when said valve member is in said closed position, said intermediate groove being operable for trapping fluid therein during closing movement of said valve member for cushioning the seating impact of said second mating surface upon engagement with said first mating surface.

5. A valve assembly as set forth in claim 4 wherein:
(a) said relief means comprises a relief groove on one of said mating surfaces, said relief groove extending from said passage adjacent one of said peripheral portions and opening into said intermediate groove whereby fluid is communicated from said fluid flow passage to said intermediate groove when said valve member is in said closed position; and
(b) said relief groove cooperates with said intermediate groove to materially reduce said fluid pressure required to disengage said mating surfaces and open said valve assembly.

6. A valve assembly as set forth in claim 4 wherein:
(a) said relief means comprises a relief groove on one of said mating surfaces, said relief groove extending from said passage adjacent one of said peripheral portions and opening into said intermediate groove whereby fluid is communicated from said fluid flow passage to said intermediate groove when said valve member is in said closed position; and
(b) said relief groove cooperates with said intermediate groove to facilitate breaking said cohesion at said contact area.

7. A poppet valve assembly for controlling flow of fluid under pressure comprising:
(a) a passage through said poppet valve assembly for fluid flow;
(b) a seat member having an inlet portion of said passage extending therethrough and a seat face with a first mating surface surrounding said passage inlet portion;
(c) a cage member positioned in spaced relation to said seat member whereby an outlet portion of said fluid flow passage is defined between said cage and seat members for receiving fluid from said passage inlet portion, said cage member having a guide bore therein;
(d) a valve member movably mounted with respect to said seat member between a closed position and an open position whereby fluid flow is respectively prevented and allowed through said passage, said valve member including:
(1) a head having a second mating surface for engaging said first mating surface to define a contact area therebetween when said valve member is in said closed position; and
(2) a valve stem extending from said valve member head and slidably positioned within said guide bore;
(e) resilient means engaging said cage member and said valve member for urging said valve member to said closed position; and
(f) relief means comprising a relief groove extending along one of said first and second mating surfaces from an interior portion of said contact area to a periphery of said contact area; said relief groove communicating fluid from said passage with an inner portion of said contact area for operably reducing a force required to disengage said mating surfaces and move said valve member to said open position; and wherein:
(g) said first and second mating surfaces are uninterrupted by said relief groove over a continuous circumferential portion of said contact area whereby flow of fluid through said passage is prevented when said valve member is in the closed position thereof.

8. A poppet valve assembly as set forth in claim 7 wherein:
(a) said force required to move said valve member from said closed position to said open position comprises a fluid pressure in said fluid flow passage sufficient to disengage said mating surfaces;
(b) said relief means operably reduces said passage fluid pressure required to disengage said mating surfaces and move said valve member to said open position.

9. A poppet valve assembly as set forth in claim 8 wherein:
(a) said second mating surface of said valve member head has a frusto-conical configuration;
(b) said contact area has a first peripheral portion surrounding and adjacent said first portion of said passage and a second peripheral portion adjacent said fluid flow passage second portion; and
(c) one of said mating surfaces has an intermediate groove coaxial with said second mating surface intermediate and in spaced relation to said first peripheral portion and said second peripheral portion edge of said contact area when said valve member is in said closed position, said intermediate groove being operable for trapping fluid therein during closing movement of said valve member for cushioning the seating impact of said second mating surface upon engagement with said first mating surface.

10. A poppet valve assembly as set forth in claim 9 wherein:
(a) said relief means comprises a relief groove on one of said mating surfaces, said relief groove extending from said passage adjacent one of said peripheral portions and opening into said intermediate groove whereby fluid is communicated from said fluid flow passage to said intermediate groove when said valve member is in said closed position; and
(b) said relief groove cooperates with said intermediate groove to materially reduce said fluid pressure required to disengage said mating surfaces and open said valve assembly.

11. In a piston type compressor, the improvement of a valve assembly comprising:
(a) a passage through said valve assembly for fluid flow;
(b) a seat member having an inlet portion of said passage extending therethrough and a first mating surface surrounding said passage inlet portion;
(c) a cage member positioned in spaced relationship to said seat member such that an outlet portion of said passage for fluid flow is defined between said cage member and said seat member for receiving fluid from said passage inlet portion;
(d) a valve member having a second mating surface engaging said first mating surface to define a contact area therebetween when said valve member is in a closed position whereby fluid flow through said passage is substantially prevented, said valve member being movably mounted with respect to said seat member between said closed position and an open position for allowing fluid to flow through said passage;
(e) resilient means engaging said cage member and said valve member for urging said valve member to said closed position;
(f) a first and a second peripheral edge of said contact area respectively being adjacent said inlet portion and said outlet portion of said passage;
(g) said valve member being movable to said open position by a fluid pressure differential with respect to said inlet portion and said outlet portion of said passage, said fluid pressure differential being sufficient to overcome said resilient means urging said valve member to said closed position and thereby disengage said mating surfaces and open said valve assembly;

(h) an intermediate groove extending along one of said first and second mating surfaces, said intermediate groove being in spaced relation to said first peripheral edge and said second peripheral edge of said contact area and in communication with the other of said mating surfaces when said valve member is in said closed position, said intermediate groove being operable for trapping fluid therein during closing movement of said valve member for cushioning the seating impact of said second mating surfaces upon engagement with said first mating surface; and (i) a relief groove extending along one of said first and second mating surfaces, said relief groove extending from only one of said contact area peripheral edges and opening into said intermediate groove whereby fluid is communicated between said fluid flow passage to said intermediate groove when said valve member is in said closed position and whereby said relief groove cooperates with said intermediate groove to materially reduce said fluid pressure differential required to disengage said mating surfaces and open said valve assembly without allowing fluid to flow through said relief groove from said passage inlet to said passage outlet when said valve is in the closed position thereof.

12. A compressor as set forth in claim 11 wherein:
(a) said relief groove is on said second mating surface of said valve member.

13. A compressor as set forth in claim 11 wherein:
(a) said resilient means urging said valve member to said closed position comprises a spring member mounted on said cage member.

14. A lift-type valve assembly for controlling flow of fluid therethrough which includes:
(a) a passage through said valve assembly for fluid flow, said passage having an inlet portion and an outlet portion;
(b) a first mating surface surrounding said passage inlet portion;
(c) a valve member having a second mating surface and being movable with respect to said valve assembly between a closed position, wherein said first and second mating surfaces are in seating engagement such that a contact area is defined therebetween and said passage inlet portion is substantially sealed, and an open position for allowing fluid to flow from said passage inlet portion to said passage outlet portion; said contact area having a first peripheral edge adjacent said inlet portion, a second peripheral edge adjacent said passage outlet portion and in interior portion spaced from said first and second peripheral edges;
(d) said valve member being movable from said closed position to said open position by a fluid pressure differential across said valve assembly with a greater fluid pressure in said passage inlet portion than in said passage outlet portion;
(e) a relief groove communicating fluid from said passage with said interior portion of said contact area; said relief groove extending along one of said mating surfaces to one of said contact area peripheral edges whereby a force associated with said one fluid pressure facilitates moving said valve member to said open position; and (f) said contact area having a continuous uninterrupted portion extending along the entire length of one of said first and second peripheral edges such that said relief groove does not connect said first and second peripheral edges when said valve member is in the closed position thereof.

15. A valve assembly as set forth in claim 14 wherein:
(a) said force associated with said one fluid pressure operably reduces said fluid pressure differential required to move said valve member to said open position.

16. A valve assembly as set forth in claim 14 wherein:
(a) said relief means communicates fluid from said passage outlet portion with an inner portion of said contact area.

17. In a piston type compressor, the improvement of a poppet valve assembly comprising:
(a) a passage through said poppet valve assembly for pressurized fluid flow;
(b) a seat member having an inlet portion of said passage extending therethrough and a first mating surface surrounding said passage inlet portion;
(c) a cage member positioned in spaced relation to said seat member whereby an outlet portion of said fluid flow passage is defined between said cage and seat members for receiving pressurized fluid from said passage inlet portion, said cage member having a guide bore therein;
(d) a poppet valve member movably mounted with respect to said seat member between a closed position and an open position whereby pressurized fluid flow is respectively prevented and allowed through said passage, said valve member including:
  (1) a head having a second mating surface for engaging said first mating surface to define a contact area therebetween when said valve member is in said closed position; said contact area having a first peripheral edge associated with said passage inlet portion, a second peripheral edge associated with said passage outlet portion and an interior portion spaced from both said first and second peripheral edges; and
  (2) a valve stem extending from said valve member head and slidably positioned within said guide bore;
(e) resilient means engaging said cage member and said valve member for urging said valve member to the closed position thereof;
(f) an intermediate groove along said first mating surface on said valve member open onto said second mating surface; said intermediate groove being in spaced relation to both of said contact area peripheral edges and in communication with said first mating surface when said valve member is in the closed position thereof;
(g) a relief groove along said first mating surface on said valve member open onto said second mating surface; said relief groove extending between said contact area second peripheral edge and said intermediate groove whereby fluid is communicated from said passage to said intermediate groove when said valve member is in the closed position thereof; said relief groove not extending to said first contact area peripheral edge;
(h) a force required to move said valve member from the closed position to the open position thereof comprises a fluid pressure differential between said passage inlet and outlet portions sufficient to disengage said mating surfaces and move said valve member to the open position thereof;

(i) said relief groove cooperating with said intermediate groove to materially reduce said fluid pressure differential required to disengage said mating surfaces and open said valve assembly; and (j) said first and second mating surfaces each include an uninterrupted, continuous, and mating circumferential portion positioned between said first contact area peripheral edge and said intermediate groove such that fluid is substantially prevented from flowing past said valve member when in the closed position thereof.

* * * * *